United States Patent
Winterowd et al.

(10) Patent No.: US 10,414,945 B2
(45) Date of Patent: Sep. 17, 2019

(54) WOOD PRODUCTS WITH ENHANCED RESISTANCE TO GRAYING AND WATER INFILTRATION AND RELATED TECHNOLOGY

(71) Applicant: Weyerhaeuser NR Company, Federal Way, WA (US)

(72) Inventors: Jack G. Winterowd, Puyallup, WA (US); Erik M. Parker, Bonney Lake, WA (US); Glen D. Robak, Bonney Lake, WA (US); Jeffrey Smith, Tacoma, WA (US); William D. Brady, Clarksburg, WV (US)

(73) Assignee: Weyerhaeuser NR Company, Federal Way, WA (US)

( * ) Notice: Subject to any disclaimer, the term of this patent is extended or adjusted under 35 U.S.C. 154(b) by 244 days.

(21) Appl. No.: 15/208,408

(22) Filed: Jul. 12, 2016

(65) Prior Publication Data
US 2016/0369128 A1    Dec. 22, 2016

Related U.S. Application Data

(63) Continuation-in-part of application No. 13/906,181, filed on May 30, 2013, now abandoned.

(51) Int. Cl.
*C09D 175/04* (2006.01)
*B27K 3/15* (2006.01)
(Continued)

(52) U.S. Cl.
CPC .......... *C09D 175/04* (2013.01); *B05D 7/06* (2013.01); *B27K 3/0292* (2013.01); *B27K 3/08* (2013.01); *B27K 3/15* (2013.01); *B27K 3/153* (2013.01); *B27K 3/42* (2013.01); *C09D 15/00* (2013.01); *B27K 2200/10* (2013.01); *B27K 2200/30* (2013.01); *B27K 2240/70* (2013.01);
(Continued)

(58) Field of Classification Search
None
See application file for complete search history.

(56) References Cited

U.S. PATENT DOCUMENTS 4,180,645 A * 12/1979 Emmons ................. C08G 18/04
525/123
6,350,331 B1 * 2/2002 Kon .......................... B27N 3/00
144/350

(Continued)

*Primary Examiner* — Chinessa T. Golden
(74) *Attorney, Agent, or Firm* — Perkins Cole LLP

(57) ABSTRACT

A composite wood product in accordance with a particular embodiment of the present technology includes a composite substrate and a sealant disposed within a surface portion of the substrate. The substrate includes wood and a binder. The sealant includes photoresponsive molecules present within the surface portion of the substrate at an average concentration greater than 1000 parts per million. In response to a 120-day exposure at 7 inches separation distance to a UV lamp with a UVA (315-400 nm) output of 13.6 W and a UVB (280-315 nm) output of 3.0 W, a CIELab b* value of the substrate decreases by a first amount, a CIELab b* value of the sealant increases by a second amount, and a CIELab b* value of the overall wood product decreases by an amount less than the first amount, increases by an amount less than the second amount, or is unchanged.

9 Claims, 6 Drawing Sheets

(51) Int. Cl.
*B27K 3/08* (2006.01)
*B27K 3/42* (2006.01)
*B05D 7/06* (2006.01)
*C09D 15/00* (2006.01)
*B27K 3/02* (2006.01)
*C08L 75/00* (2006.01)

(52) U.S. Cl.
CPC ........... *B27K 2240/90* (2013.01); *C08L 75/00* (2013.01); *Y10T 428/31591* (2015.04)

(56) References Cited

U.S. PATENT DOCUMENTS

| | | | |
|---|---|---|---|
| 6,764,541 B1 * | 7/2004 | Banning | C09B 29/0003 106/31.29 |
| 2005/0182188 A1 * | 8/2005 | Rische | C08G 18/0819 524/589 |

* cited by examiner

WOOD PRODUCTS WITH ENHANCED RESISTANCE TO GRAYING AND WATER INFILTRATION AND RELATED TECHNOLOGY

CROSS-REFERENCE TO RELATED APPLICATION

This application is a continuation-in-part of U.S. patent application Ser. No. 13/906,181, filed May 30, 2013, which is incorporated herein by reference in its entirety. To the extent the foregoing application and/or any other materials incorporated herein by reference conflict with the present disclosure, the present disclosure controls.

TECHNICAL FIELD

The present technology is related to wood products, such as engineered and non-engineered lumber used in the construction of residential and commercial buildings.

BACKGROUND

Many wood products used in construction are intended to be protected from outdoor elements, such as by paint, siding, roofing, or other covering. In practice, however, these wood products are often exposed to outdoor elements for significant periods of time. For example, wood products are often stored outdoors at a lumber yard or at a construction site. Alternatively or in addition, wood products may be installed at a construction site and then left uncovered for weeks or months during the course of construction. Exposure to outdoor elements can cause undesirable changes in wood products. For example, exposure to precipitation can cause some wood products to expand non uniformly. Wood products that have expanded due to exposure to precipitation often must be reshaped (e.g., by sanding or planing) to fit properly with other building components. As another example of an undesirable change, wood products exposed to sunlight often gray due to photo-degradation of flavonoids and/or other colored wood constituents. Many consumers consider wood products that are gray to be weathered, old, and undesirable, even if there is no measurable loss of strength associated with the gray color. For these and/or other reasons, there is a need for innovation in this field.

BRIEF DESCRIPTION OF THE DRAWINGS

Many aspects of the present technology can be better understood with reference to the following drawings. The components in the drawings are not necessarily to scale. Instead, emphasis is placed on illustrating clearly the principles of the present technology. For ease of reference, throughout this disclosure the same reference numbers may be used to identify identical, similar, or analogous components or features of more than one embodiment of the present technology.

DETAILED DESCRIPTION

Figure 1:
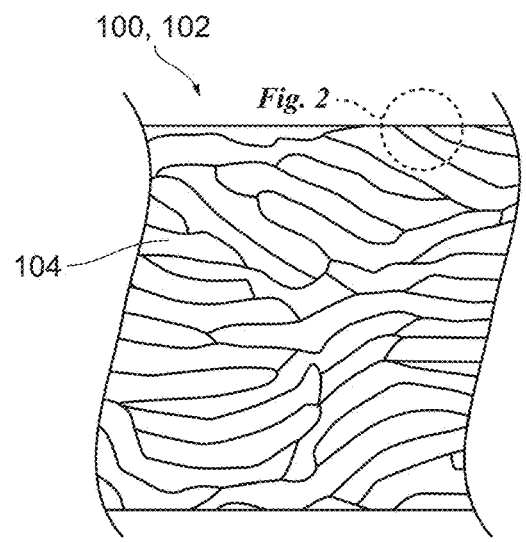
FIG. 1 is a transverse cross-sectional end view of a composite wood product in accordance with an embodiment of the present technology.

Wood products and related devices, systems, and methods in accordance with embodiments of the present technology can at least partially address one or more problems associated with conventional technologies whether or not such problems are stated herein. For example, wood products in accordance with at least some embodiments of the present technology include innovative sealants that reduce water infiltration and graying. A wood product in accordance with a particular embodiment includes a composite substrate and a sealant disposed within a surface portion of the substrate. The substrate can include wood and a binder. The sealant can include a crosslinked urethane resin containing photoresponsive molecules. When the wood product is exposed to precipitation, the sealant can reduce or eliminate infiltration of water into an interior of the wood product, thereby preventing or eliminating swelling associated with such water infiltration. When the wood product is exposed to sunlight, the sealant can gradually yellow, thereby at least partially counteracting a simultaneous gradual graying of the substrate. Accordingly, the wood product can remain relatively stable in dimension and color even after long periods of exposure to outdoor elements. For example, treated wood products in accordance with at least some embodiments of the present technology are able to maintain dimensional stability and a desirable tan/brown coloration for 2-3 months longer than corresponding untreated wood products.

Specific details of wood products and related products and methods in accordance with several embodiments of the present technology are described herein with reference to FIGS. 1-11. Although these embodiments may be disclosed herein primarily or entirely in the context of composite wood products for structural applications, other contexts in addition to those disclosed herein are within the scope of the present technology. For example, at least some features of composite wood products described herein may be implemented in the context of non-composite wood products. As another example, at least some features of wood products for structural applications described herein may be implemented in the context of wood products for non-structural applications. Furthermore, it should be understood, in general, that other products and methods in addition to those disclosed herein are within the scope of the present technology. For example, products and methods in accordance with embodiments of the present technology can have different and/or additional configurations, components, and/or procedures than those disclosed herein. Moreover, a person of ordinary skill in the art will understand that products and methods in accordance with embodiments of the present technology can be without one or more of the configurations, components, and/or procedures disclosed herein without deviating from the present technology.

As used herein, the term "wood product" refers to a product manufactured from logs, such as lumber (e.g., boards, dimensional lumber, solid-sawn lumber, joists, headers, beams, timbers, moldings, laminated lumber, finger-jointed lumber, and semi-finished lumber), composite wood products, and components of any of the aforementioned examples. The term "composite wood product" refers to a range of derivative wood products manufactured by binding together strands, particles, fibers, veneers, and/or other wood pieces together with adhesive. Examples of composite wood products include glulam, plywood, Parallam, oriented strand board, oriented strand lumber, laminated veneer lumber, laminated strand lumber, particleboard, medium density fiberboard, cross-laminated timber, and hardboard, among others.

Figure 2:
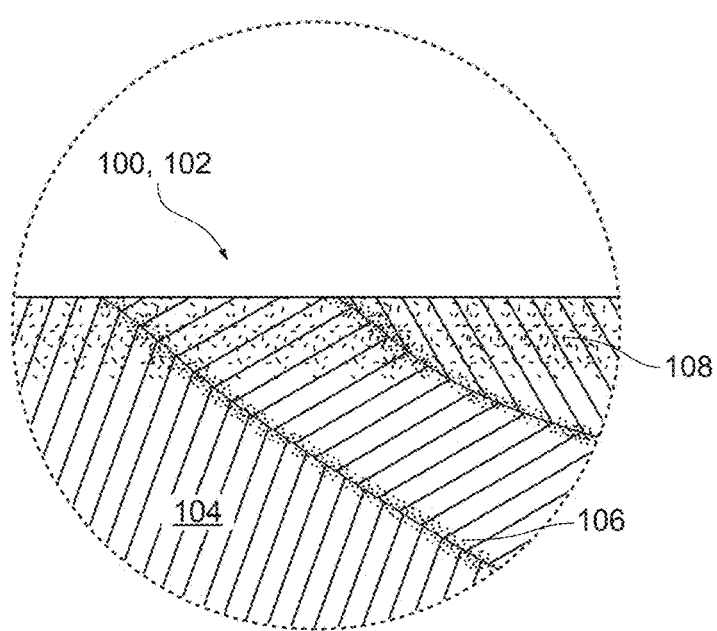
FIG. 2 is an enlarged view of a portion of FIG. 1.

FIG. 1 is a transverse cross-sectional end view of a composite wood product 100 in accordance with an embodiment of the present technology. FIG. 2 is an enlarged view of a portion of FIG. 1. With reference to FIGS. 1 and 2 together, the wood product 100 can include a composite substrate 102 including pieces (e.g., chips, flakes, strands, etc.) of wood 104 and a binder 106 (FIG. 2) that holds together the wood 104. The wood product 100 can further include a sealant 108 disposed within a surface portion of the substrate 102. In at least some cases, the binder 106 and the sealant 108 are polymeric materials dispersed within networks of cellulose fibers of the wood 104. In FIG. 2, the binder 106 and the sealant 108 are shown only at surface portions of the substrate 102 and the wood 104, respectively. It should be understood, however, that the binder 106 and the sealant 108 may be distributed more widely, such as throughout the substrate 102 and the wood 104, respectively.

The sealant 108 can include photoresponsive molecules that gradually react to form colored molecules during exposure of the wood product 100 to outdoor elements, such as light or other radiation. In this way, the photoresponsive molecules can at least partially mask or otherwise compensate for gradual graying of the substrate 102. The photoresponsive molecules can be present within the surface portion of the substrate 102 at a relatively high concentration. For example, the photoresponsive molecules can be present within an outermost one millimeter of the substrate 102 at an average concentration greater than 1000 parts per million. Alternatively, the surface portion of the substrate 102 in which the photoresponsive molecules are present at an average concentration greater than 1000 parts per million can be an outermost 0.025 millimeter of the substrate 102, an outermost 0.10 millimeter of the substrate, an outermost 0.50 millimeter of the substrate, or an outermost 0.75 millimeter of the substrate. The surface portion of the substrate 102 in which the photoresponsive molecules are present at an average concentration greater than 1000 parts per million can also be greater than 1 millimeter, such as any depth of 1-6 millimeters.

The sealant 108 can further include colorizing molecules that cause the wood product 100 to have a desirable starting color before the wood product 100 is exposed to outdoor elements. The photoresponsive molecules and the colorizing molecules can be derived from the same or similar precursors. The colorizing molecules can include covalently bound chromophores that give these molecules a strong initial color. For example, covalently bound chromophores can be responsible for most or all of the color of the colorizing molecules. Unlike the photoresponsive molecules, the colorizing molecules are not expected to increase in yellowness in response to exposure to ultraviolet light. Both the photoresponsive molecules and the colorizing molecules can be well suited for protecting the wood product 100 from water infiltration.

In several embodiments, the photoresponsive molecules and the colorizing molecules are part of a crosslinked resin. The resin can be present within an outermost one millimeter of the substrate 102 at an average concentration from 0.05% to 15.0% by weight. In at least some cases, the resin is a urethane resin. The photoresponsive molecules can be substituted aniline compounds. In several embodiments, the photoresponsive molecules are formed from the reaction of 4,4'-MDI (4,4'-methylene diphenyl diisocyanate), 2,4'-MDI (2,4'-methylene diphenyl diisocyanate), pMDI (polymeric methylene diphenyl diisocyanate), TDI (toluene diisocyanate) or another suitable aromatic multifunctional isocyanate and water. The photoresponsive molecules can be formed in a sufficient concentration in the wood product 100, for example, by applying water and low molecular weight multifunctional isocyanates to a surface of the substrate 102 and maintaining the substrate 102 at a relatively low temperature (e.g., less than about 160° F.). Once formed, the photoresponsive molecules can react with oxygen when exposed to ultraviolet light to form colored compounds that closely resemble the color of natural wood.

The colorizing molecules can be formed from the reaction of 4-4'-MDI, 2-4'-MDI, pMDI, TDI, or another suitable aromatic multifunctional isocyanate and a polyol colorant. Examples of suitable polyol colorants include those in the REACTINT® product line manufactured and distributed by Milliken and Company of Spartanburg, S.C. Additional examples of polyol colorants are described in U.S. Pat. No. 4,912,203, which is incorporated herein by reference in its entirety.

Figure 3:
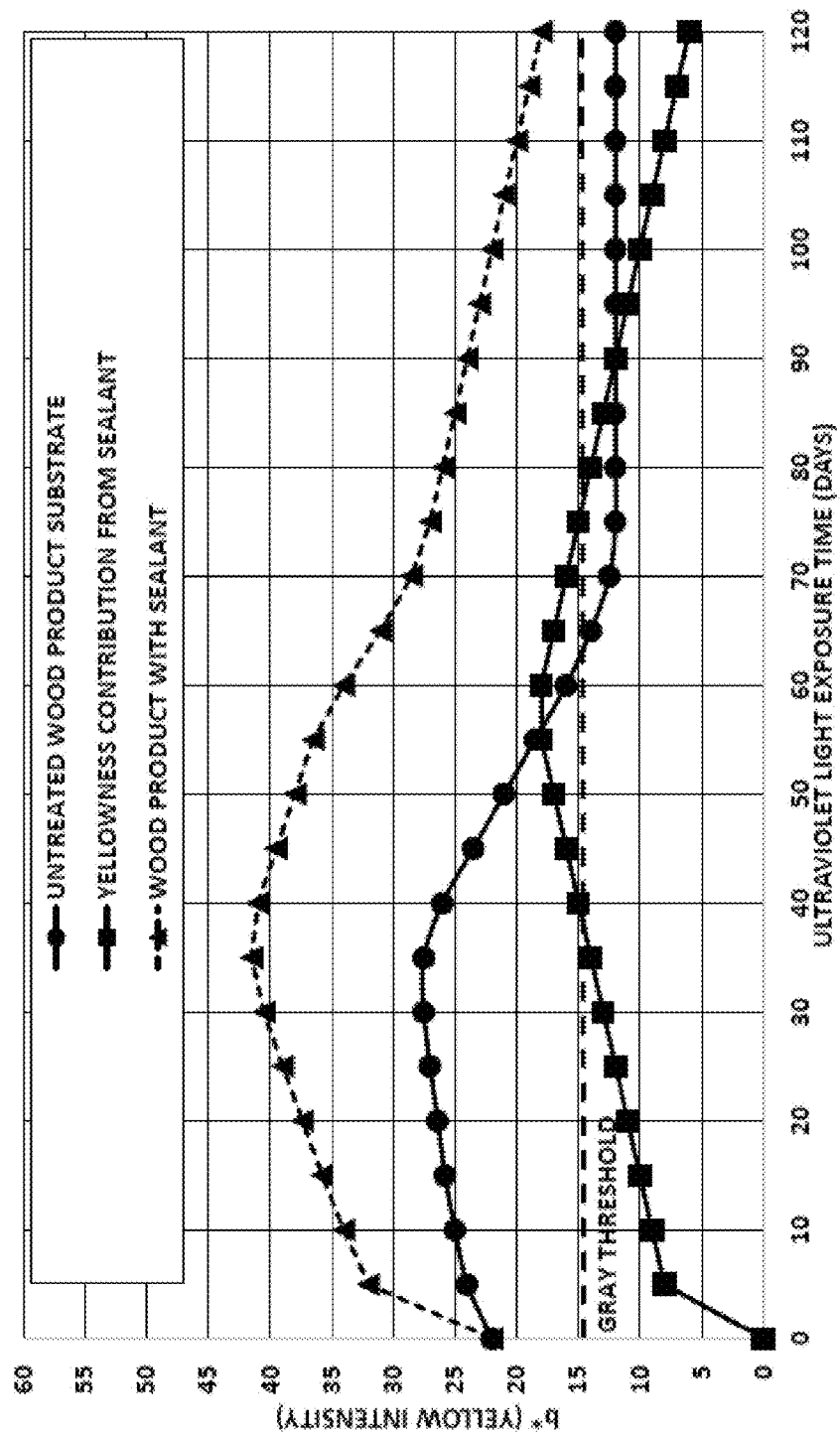
FIG. 3 is a plot of yellowness relative to ultraviolet light exposure for a wood product and components thereof in accordance with an embodiment of the present technology.

FIG. 3 is a plot of change in yellowness relative to ultraviolet light exposure time for the wood product 100, the substrate 102, and the sealant 108. It should be understood that FIG. 3 is an approximation based on the results of several experiments. FIG. 3 indicates how yellowness changes in response to ultraviolet light exposure time for the wood product 100, the substrate 102, and the sealant 108. In practice, different untreated wood substrates are expected to turn gray at different rates. For example, OSB having a surface layer with pMDI binder is expected to turn gray faster than OSB having a surface layer with phenol-formaldehyde binder. Both of these product types are expected to experience an extended period of non-graying when treated with sealants in accordance with embodiments of the present technology. Likewise, the change in yellowness associated with the sealant 108 is expected to be proportional to the amount of the sealant 108 applied to the substrate 102.

In a particular example, the time for the wood product 100 to turn gray under field exposure conditions may be extended by 2-3 months given an application of isocyanate of 4-6 g/ft$^2$, a total application of water of 4-8 g/ft$^2$, and a curing temperature of less than 120° F. In FIG. 3, yellowness is expressed as b* on a CIELab scale from 0-60, and time is expressed as days of exposure to a UV lamp (Ultra Vitalux by Osram) with a UVA (315-400 nm) output of 13.6 W and a UVB (280-315 nm) output of 3.0 W. The test specimens (2"×6") were positioned 7" from the lamp and maintained at a temperature of 108° F. and a relative humidity of 30-50%. On the CIELab scale, there is a lower threshold for the b* value of about 12 below which most consumers perceive a wood product to be gray. For some applications, there might also be an upper threshold above which most consumers perceive a wood product to be unnatural. It can be desirable to maintain the yellowness of the wood product 100 between the upper and lower thresholds for as long as possible.

As shown in FIG. 3, the yellowness of the substrate 102 (without sealant) may actually increase for a period of time when it is initially exposed to ultraviolet light. However, with continued exposure, the yellowness will decrease and eventually the substrate 102 will have a gray appearance. This can occur, for example, due to ultraviolet light degrading naturally occurring yellow and red-colored flavonoids and/or other colored compounds in the wood 104. For some wood products the initial yellowness is about 22 on the CIELab b* and the gray threshold is about 15. The yellowness of the sealant 108 may increase by about 13 on the CIELab b* scale during the first 60-day exposure period. This can occur, for example, due to the gradual formation of quinone-like molecules in a urethane matrix of the sealant 108. With contributions from both the substrate 102 and the sealant 108, the yellowness of the treated wood product 100 may decrease to about 18 by the end of the 120-day exposure period.

In the absence of the sealant 108, the yellowness of the wood product 100 over the course of the 120-day exposure may be the same as the yellowness of the substrate 102. As shown in FIG. 3, the yellowness of the substrate 102 may fall below the lower threshold of 15 at about 62 days of exposure, whereas the yellowness of the wood product 100 may remain above the lower threshold of 15 for the full 120-day exposure and beyond. This can be at least partially due to the sealant 108 replenishing the substrate 102 with new colored compounds as the naturally occurring colored compounds in the wood 104 are depleted. In this way, the sealant 108 can significantly delay the onset of an undesirable level of graying in the wood product 100 in response to sunlight exposure while still allowing the wood product 100 to remain below the upper threshold before the ultraviolet light exposure period begins. The change in yellowness of the sealant 108 can be at least primarily due to the photoresponsive molecules. The initial yellowness of the sealant 108 can be at least primarily due to the colorizing molecules.

Eventually, sunlight exposure is expected to break down the colored molecules derived from the photoresponsive molecules, leading to a decrease in yellowness of the sealant 108. This can be seen in FIG. 3 as a decrease in the yellowness of the sealant 108 beginning after about 60 days of ultraviolet light exposure. This decrease may continue until the sealant 108 returns to its starting color. The peak yellowness of the sealant 108 is expected to occur after at least 5 days of ultraviolet light exposure. Over the course of the increasing and decreasing yellowness of the sealant 108, the onset of an undesirable level of graying in the wood product 100 can be significantly delayed. In at least some cases, this delay is at least 2-3 months, which is longer than typical periods of sunlight exposure in most construction and lumberyard settings.

In the embodiment illustrated in FIG. 3, the yellowness of the sealant 108 increases steadily over the course of the 60-day ultraviolet light exposure period, and the yellowness of the substrate 102 and the wood product 100 decrease over the period of about 35 days to about 75 days of exposure. In other embodiments, the changes in the yellowness of the sealant 108, the substrate 102, and/or the wood product 100 can be more variable. For example, although the period of ultraviolet light exposure over which the yellowness of the substrate 102 first increases by about 5.5 and then decreases by about 15.5, and the yellowness of the sealant 108 increases by about 18, is about 60-62 days in the illustrated embodiment, in other embodiments, the period can be less than 60-62 days or greater than 60-62 days. For example, the period can be 30 days, 45 days, 75 days, 90 days, 105 days, 120 days, or another period within a range from 15 days to 150 days of ultraviolet light exposure.

Conventionally, a sealant that protects a wood product from water infiltration and significantly delays the onset of an undesirable level of graying has not been available. By way of theory and without wishing to be bound to theory, these properties of the sealant 108 may be at least partially due to constituent low molecular weight precursors of quinone-like compounds. For example, the photoresponsive molecules of the sealant 108 may form colored quinone-like molecules in response to all or a portion of the 120-day ultraviolet light exposure.

The photoresponsive molecules can be substituted aniline compounds that do not initially absorb visible light to a significant extent, but have the ability to gradually transform into quinone-like molecules when exposed to oxygen and ultraviolet light over time. The resulting quinone-like molecules may absorb visible light and consequently impart yellowness to the wood product 100. The quinone-like molecules can include six-membered carbon rings that contain two double bonds, which are conjugated. These quinone-like molecules can further contain two carbonyl groups. In addition to increasing the resistance of the wood product 100 to graying, the photoresponsive molecules and the quinone-like molecules may provide the wood product 100 with durable resistance to water infiltration. In at least some cases, the photoresponsive molecules within the outermost one millimeter of the substrate 102 have the same or different respective molecular weights less than 500 daltons.

The formulation of the sealant 108 can be selected to promote the formation of low-molecular weight precursors of desirable quinone-like molecules. For example, when first applied to the substrate 102, the sealant 108 can include at least 5% (e.g., at least 25%, 50%, 70%, 80%, or 90%) by mass of aromatic multifunctional isocyanates with at least 55% (e.g., at least 70%, 80%, or 90%) by mass of the aromatic multifunctional isocyanates having the same or different molecular weights less than 300 daltons. The relatively small size of these aromatic multifunctional isocyanates may allow for faster and more complete penetration into the surface of the substrate 102, thereby reducing the concentration of the isocyanate in any region of the wood which helps to retard polymerization of the isocyanate.

Achieving a high concentration (e.g., 1000 parts per million or more) of low-molecular weight precursors of desirable quinone-like molecules in the wood product 100 is also dependent on process conditions before, after, and/or while the sealant 108 is applied to the substrate 102. In at least some embodiments, the surface portion of the substrate 102 is wetted with liquid water before and/or after application of the sealant 108. Furthermore, the substrate 102 can be maintained at low temperatures during and after application of the sealant 108. For example, the substrate 102 can be exposed to an average temperature less than 160° F. over a 24 hour period immediately after the substrate 102 is treated with the low molecular weight isocyanate. In at least some cases, maintaining the substrate 102 at high moisture content and a low temperature can enhance the formation and persistence of desirable photoresponsive molecules.

Figure 4:
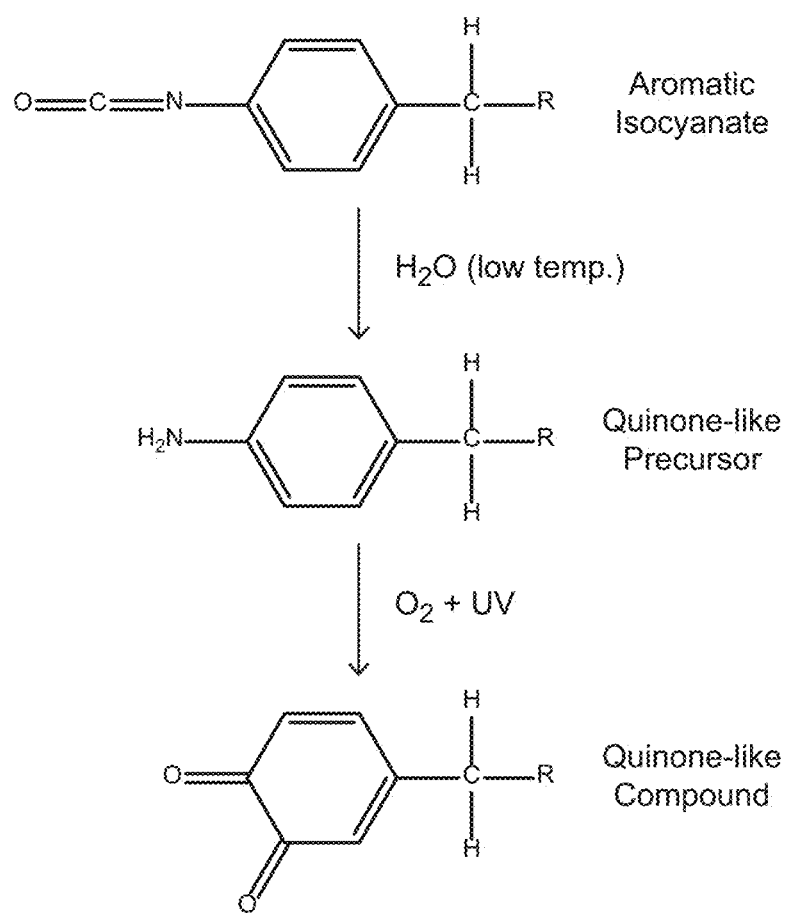
FIG. 4 is a diagram of chemical reactions that may occur in connection with at least some embodiments of the present technology.

FIG. 4 is a diagram of chemical reactions that may occur in connection with at least some embodiments of the present technology. With reference to FIG. 4, and with the understanding that FIG. 4 is described solely by way of non-limiting theory, an ultraviolet-light-reactive urethane with quinone-like precursors can be prepared by applying an aromatic isocyanate to moist wood and subjecting the applied aromatic isocyanate to low temperatures for a period of at least 24 hours. Water can be added to the wood before and after application of the aromatic isocyanate. The low temperatures help to retard polymerization reactions and allow a relatively high percentage of the isocyanate groups to be converted into amines. Because the resulting amines are diluted within the wood tissue and are maintained at relatively low temperatures, they are more likely to be preserved instead of quickly reacting with remaining isocyanate functional groups to form polyureas. Eventually, when the amine groups on aromatic rings of the aromatic isocyanates are exposed to ultraviolet light and oxygen, these aromatic isocyanates may be converted to quinone-like compounds having an intense yellow color.

Figure 5:
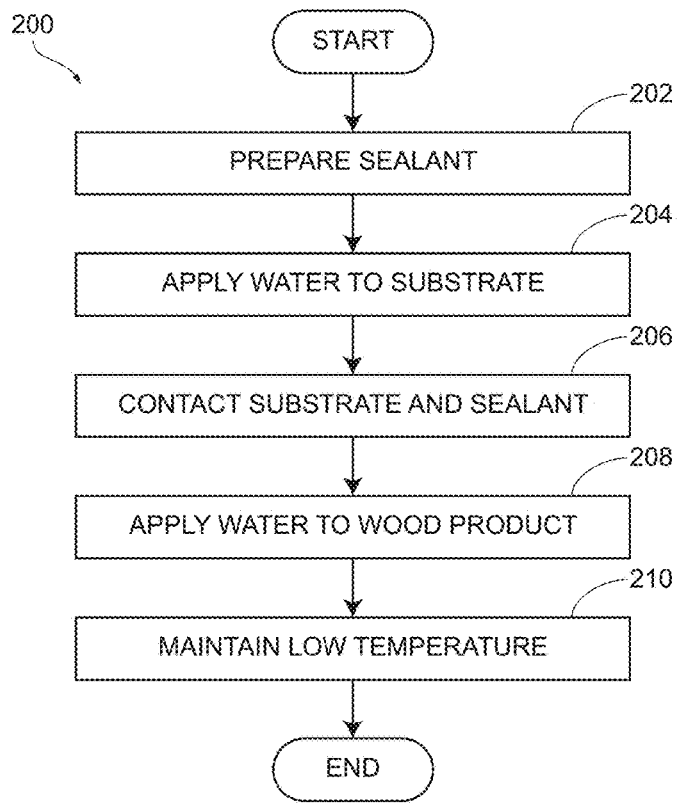
FIG. 5 is a flow chart illustrating a method for making a composite wood product in accordance with an embodiment of the present technology.

FIG. 5 is a flow chart illustrating a method 200 for making the wood product 100 in accordance with an embodiment of the present technology. With reference to FIGS. 1-5 together, the method 200 can include preparing the sealant 108 (block 202). In one example, the method 200 includes reacting a minor portion of the aromatic isocyanate molecules within the sealant 108 with molecules of a polyol colorant to form oligomer molecules having covalently bound chromophores. The chromophores are selected to give the substrate 102 an initial color similar to the natural color of the wood 104. In a particular example, a combination of yellow, red, and blue polyol dyes is added to the aromatic isocyanate to produce a color that is initially brown or tan. The polyol colorant can be combined with the aromatic isocyanate in a tank at a molar ratio that involves a substantial excess of the aromatic isocyanate before the sealant 108 is applied to the substrate 102. Alternatively, the polyol colorant can be applied to the substrate 102 separately. In at least some cases, the polyol colorant promotes reaction of the aromatic isocyanate with water, thereby reducing manufacturing times.

The method 200 can further include applying liquid water to the substrate 102 (block 204). For example, liquid water can be applied to a surface of the substrate 102 at a rate of at least one grain of liquid water per square foot of the surface, such as a rate within a range from 1 to 15 grams of liquid water per square foot of the surface or a rate within a range from 2 to 6 grams of liquid water per square foot of the surface. The liquid water can be applied to one, some, or all sides of the substrate 102, such as using sprayers or rollers. Alternatively, the substrate 102 can be dipped in liquid water. In at least some cases, the substrate 102 is at an elevated temperature (e.g., 65° C.) when the liquid water is applied. This can be due to the substrate 102 being recently formed in a high-temperature process. The liquid water can be at 20° C. and can cool the substrate 102 by 10° C. or more.

Next, the method 200 can include applying the sealant 108 to the substrate 102 (block 206). For example, the sealant 108 can be applied to a surface of the substrate 102 at a rate of at least one gram of the sealant 108 per square foot of the surface, such as a rate within a range from 1 to 10 grams of the sealant 108 per square foot of the surface or a rate within a range from 2 to 6 grams of the sealant 108 per square foot of the surface. The sealant 108 can be applied to one, some, or all sides of the substrate 102, such as using sprayers or rollers. Alternatively, the substrate 102 can be dipped in the sealant 108. When contacting the substrate 102, the sealant 108 can include at least 50% by weight aromatic isocyanate molecules having the same or different respective molecular weights less than 300 daltons. In at least some cases, the sealant 108 includes at least 80% by weight MDI isomers. In several embodiments, the sealant 108 includes a first isomer of MDI (e.g., 2,4'-MDI) at a concentration of at least 20% by weight, and a second isomer of MDI (e.g., 4,4'-MDI) different than the first isomer of MDI at a concentration of at least 20% by weight.

After the substrate 102 is treated with the sealant 108, the method 200 can include reapplying liquid water to the substrate 102 (block 208). For example, liquid water can be reapplied to a surface of the substrate 102 at a rate of at least one gram of liquid water per square foot of the surface, such as a rate within a range from 1 to 15 grams of liquid water per square foot of the surface or a rate within a range from 2 to 6 grams of liquid water per square foot of the surface. The liquid water can be applied to one, some, or all sides of the substrate 102, such as using sprayers or rollers. Alternatively, the substrate 102 can be dipped in liquid water. In some embodiments, the liquid water is at 20° C. In these and other embodiments, the liquid water can further cool the substrate 102, which can be useful, for example, to inhibit emission of a volatile component of the sealant 108 in a finishing line workplace. In addition or alternatively, the liquid water can be useful to wash away any excess sealant 108 that, if left in place, would form a film at the surface of the substrate 102. In yet another alternative, excess sealant 108 can be mechanically removed from the substrate 102 by scraping, doctoring, etc. in order to avoid film-formation on the surface of substrate 102. If allowed to form, such a film may have an undesirable effect on the surface characteristics of the substrate 102. For example, when the substrate 102 is to be used as decking and in other cases, a film formed from excess sealant 108 may cause the surface of the substrate 102 to be excessively smooth.

The method 200 can further include maintaining the wood product 100 at low temperature (block 210) after reapplying liquid water to the substrate 102. For example, the method 200 can include exposing the substrate 102 and the sealant 108 to an average temperature less than 160° F. (e.g., within a range from 50° F. to 150° F.) over a 24-hour period immediately after applying the sealant 108 to the substrate 102. At least some of the aromatic isocyanate molecules in the sealant 108 can form photoresponsive molecules during the 24-hour period such that an average concentration of the photoresponsive molecules after the 24-hour period is greater than 1000 parts per million in an outermost one millimeter of the substrate 102.

Figure 6:
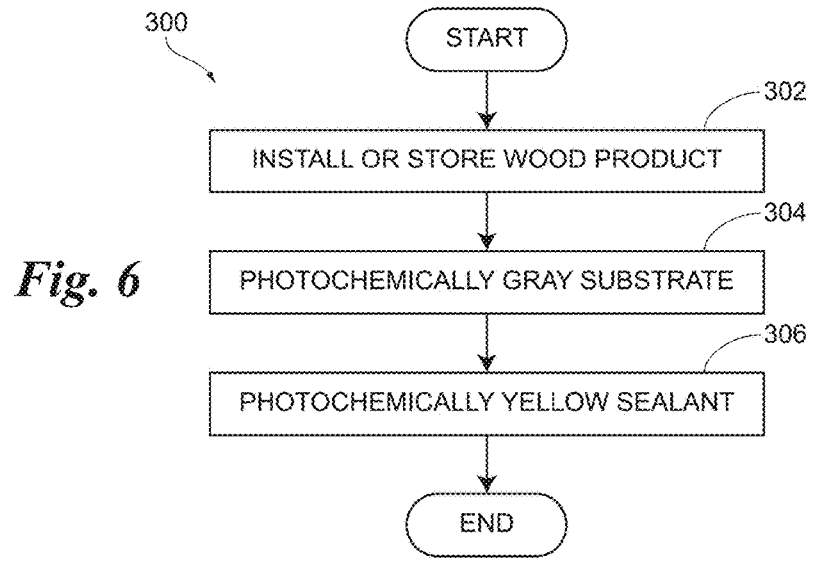
FIG. 6 is a flow chart illustrating a method for using a composite wood product in accordance with an embodiment of the present technology.

FIG. 6 is a flow chart illustrating a method 300 for using the wood product 100 in accordance with an embodiment of the present technology. With reference to FIGS. 1-4 and 6 together, the method 300 can include installing or storing the wood product 100 at a building site (block 302). The method 300 can further include photochemically graying the substrate 102 (block 304) by exposing the surface portion of the substrate 102 to sunlight. In at least some cases, this includes decreasing a b* value of the substrate 102 by at least 7 on a CIELab scale. While photochemically graying the substrate 102, the method 300 can include photochemically yellowing the sealant 108 (block 306) by exposing photoresponsive molecules within the sealant 108 to the sunlight. For example, the method 300 can include photochemically forming quinone-like molecules from the photoresponsive molecules. In at least some cases, photochemically yellowing the sealant 108 includes increasing a b* value of the sealant 108 by about 18 on the CIELab scale.

ing 7% being higher molecular weight oligomers of MDI. The moisture absorptions of the ISO-5 and W-15 coated blocks were compared to uncoated blocks of Parallam in a three-day one-sided wetting test (with wetting occurring on one of the 2"×2" major surfaces of each block). The average amount of moisture absorbed by the blocks is provided in Table 1.

TABLE 1

Moisture Absorption Test Data

| Formulation | Average Mass of Water Absorbed After 1 Day | Average Mass of Water Absorbed After 2 Days | Average Mass of Water Absorbed After 3 Days | Percentage of Multifunctional Aromatic Isocyanates in the Total Formulation | Percent of Multifunctional Aromatic Isocyanates Under 300 Daltons in Isocyanate Component of the Formulation |
|---|---|---|---|---|---|
| None | 44.6 g | 47.8 g | 53.2 g | NA | NA |
| ISO-5 | 6.5 g | 17.9 g | 32.5 g | 44% | 48% |
| W-15 | 3.0 g | 9.3 g | 13.5 g | 100% | 93% |

Figure 8:
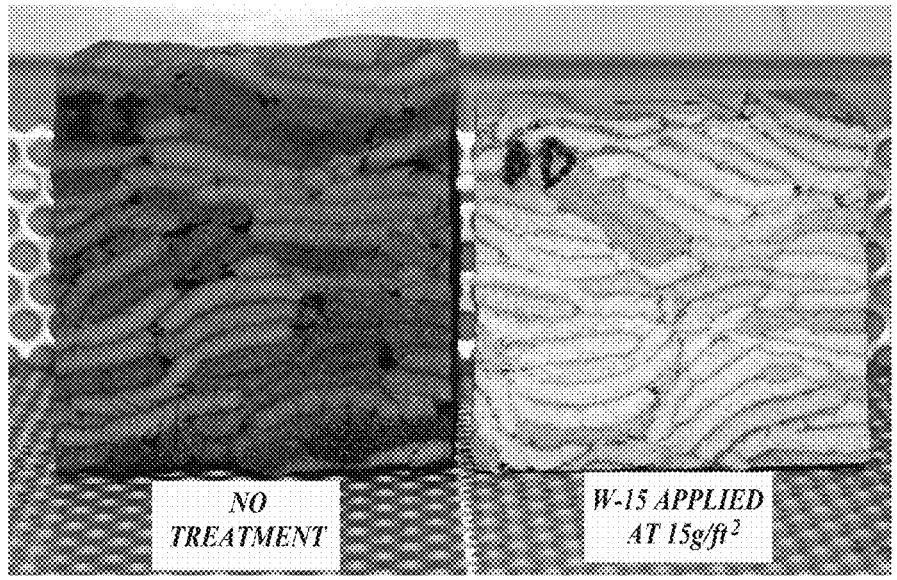
FIG. 8 is a photograph of a sample of untreated Parallam (left) and a sample of Parallam treated with a sealant in accordance with an embodiment of the present technology (right) after a three day one-sided wetting test.

FIG. 8 is a photograph of cross-sectional cuts of an untreated Parallam sample and a Parallam sample treated with W-15 at the end of a three day one-sided wetting test. The major face pictured for each sample is perpendicular to the major face directly exposed to water. This view illustrates the impact of water absorption on the inner region of the wood product.

EXAMPLES

Figure 7:
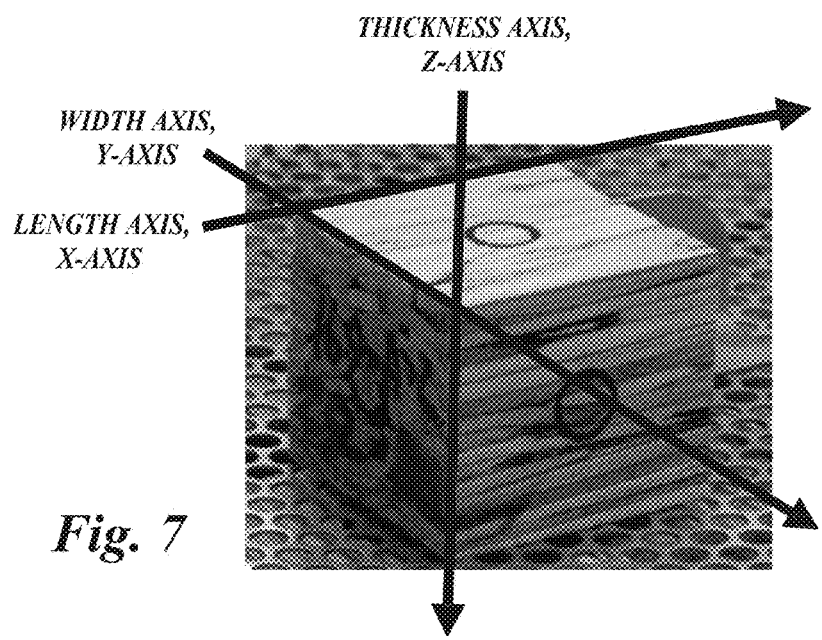
FIG. 7 is a photograph of a sample of Parallam® parallel strand lumber ("Parallam") labeled with reference axes.

The following examples are provided to illustrate certain particular embodiments of the disclosure. It should be understood that additional embodiments not limited to the particular features described are consistent with the following examples. FIG. 7 is a photograph of a block of Parallam labeled with reference axes that may be referenced in the following examples.

Example 1. First Parallel Strand Lumber Three-Day One-Sided Wetting Test

A comparative coating known as ISO-5 was applied to two opposing major faces (2.0"×2.0") of blocks (2.0"×2.0"×1.5") of Parallam at a spread rate of about 15 g/ft² using an air-pressurized paint gun. The ISO-5 contained approximately 40% isocyanate by mass with 48% of the isocyanate component being multifunctional isocyanates with a molecular weight under 300 daltons (in the form of mixed isomers of MDI), and the remaining 52% being higher molecular weight oligomers of MDI. A coating known as W-15 in accordance with an embodiment of the present technology was applied to two opposing major faces (2.0"×2.0") of blocks (2.0"×2.0"×1.75") of Parallam at a spread rate of approximately 15 g/ft². The W-15 contained approximately 93% by mass multifunctional aromatic isocyanates with a molecular weight below 300 daltons, and the remain-

Example 2. Solid Sawn Lumber Fourteen-Day Submersion Test

Ten sections of southern yellow pine lumber were treated with different penetrating liquid formulations and then subjected to a post curing step. The specimens were approximately 1.5" thick×3.5" wide×6.25" long. The specimens were cut to minimize any defects and were sorted into similar density groups. Another ten sections of southern yellow pine were treated with a phenol formaldehyde resin formulation known as Apinee 80R using a double vacuum treatment cycle in a pressure treating vessel. The Apinee 80R did not include any isocyanates. The treated specimens were then cured for 24 hours at 55° C. Another ten sections were dip treated for 20 seconds with a penetrating liquid formulation that consisted of 50% vinyltrimethoxy silane and 50%, by mass, aromatic isocyanates. The isocyanate component consisted of approximately 93% multifunctional aromatic isocyanates (MDI) with a molecular weight below 300 daltons, and the remaining 7% being higher molecular weight oligomers of MDI. This formulation is known as SIS-2. The dip treated specimens were then stored in a 90% humidity room for seven days to facilitate curing. All of the specimens were then subjected to a 14-day submersion test. The average amount of formulation that was absorbed into the specimens and the average amount of water absorbed after 7 days and 14 days of submersion are provided in Table 2.

TABLE 2

Moisture Absorption Test Data

| Formulation | Average Mass of Formulation Absorbed into Specimens | Average Mass of Water Absorbed After 7 Days | Average Mass of Water Absorbed After 14 Days | Percentage of Multifunctional Aromatic Isocyanates in the Total Formulation | Percent of Multifunctional Aromatic Isocyanates Under 300 Daltons in Isocyanate Component of the Formulation |
|---|---|---|---|---|---|
| None | NA | 141 g | 177 g | NA | NA |
| Apinee 80-R | 36 g | 78 g | 123 g | 0% | 0% |
| SIS-2 | 3 g | 30 g | 54 g | 50% | 93% |

Example 3. Second Parallel Strand Lumber Three-Day One-Sided Wetting Test

Figure 9:
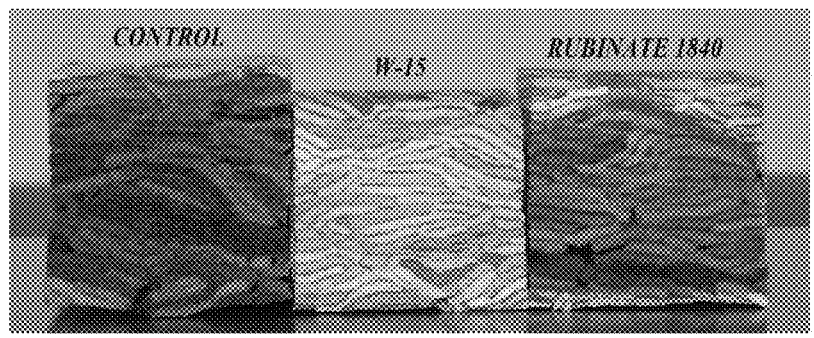
FIG. 9 is a photograph of a sample of untreated Parallam (left), a sample of Parallam treated with a sealant in accordance with an embodiment of the present technology (middle), and a sample of Parallam treated with a conventional sealant (right) after a three day one-sided wetting test.
Figure 10:
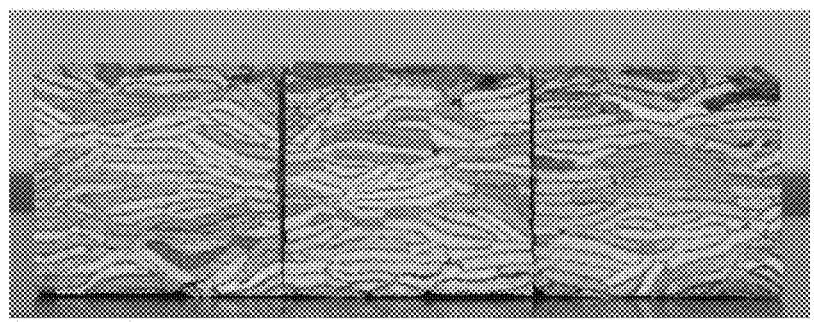
FIG. 10 is a photograph of three samples of Parallam treated with a sealant in accordance with an embodiment of the present technology after exposure to a three day one-sided wetting test.
Figure 11:
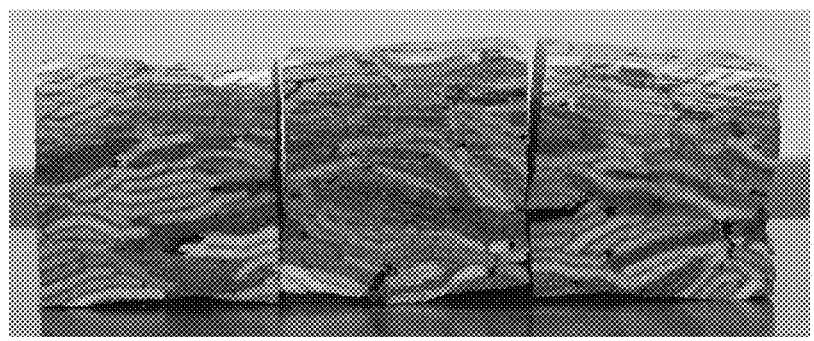
FIG. 11 is a photograph of three samples of untreated Parallam after exposure to a three day one-sided wetting test.

Six blocks (2.0"×2.0"×1.75") of Parallam were coated on two opposing major faces (2.0"×2.0") with W-1.5 at a spread rate of approximately 8.0 g/ft². Six more blocks (2.0"×2.0×1.75") were coated on two opposing major faces (2.0"×2.0") with a pMDI formulation known as Rubinate 1840 supplied by Huntsman Polyurethanes, which contains less than 50% multifunctional aromatic isocyanates of molecular weight below 300 daltons. The same 8.0 g/ft² spread rate was used for the pMDI coated blocks. These coated blocks of Parallam were compared to uncoated blocks of Parallam in a three day one-sided wetting test. The average amount of moisture gained by the blocks is provided in Table 3 and the average thickness increase is provided in Table 4.

is instead a face on the side of the block. FIG. 9 illustrates the impact of water absorption on the inner region of the wood product. The W-15 treated block remains dry and is not warped. The control and Rubinate samples are wet and warped. FIG. 10 is a photograph of faces on the sides of blocks of Parallam treated with a W-15 after exposure to a three day one-sided wetting test. FIG. 11 is a photograph of faces on the sides of blocks of untreated Parallam after exposure to a three day one-sided wetting test.

Example 4. Production-Scale Treatment of Parallam

This example describes a process for production-scale treatment of Parallam in accordance with an embodiment of the present technology. Parallam in this example is made by: (1) treating long wooden strands with phenol/formaldehyde

TABLE 3

Average Mass Gain Due to Water Absorption.

| Formulation | Average Mass of Water Absorbed After 1 Day | Average Mass of Water Absorbed After 2 Days | Average Mass of Water Absorbed After 3 Days | Percentage of Multifunctional Aromatic Isocyanates in the Total Formulation | Percent of Multifunctional Aromatic Isocyanates Under 300 Daltons in Isocyanate Component of the Formulation |
|---|---|---|---|---|---|
| None | 33.8 g | 42.8 g | 48.0 g | NA | NA |
| pMDI | 21.6 g | 31.5 g | 39.0 g | 100% | 48% |
| W-15 | 4.3 g | 6.5 g | 8.0 g | 100% | 93% |

TABLE 4

Average Thickness Increase Due to Water Absorption.

| Formulation | Average Thickness Increase After 1 Day (Inches) | Average Thickness Increase After 2 Days (Inches) | Average Thickness Increase After 3 Days (Inches) | Percentage of Multifunctional Aromatic Isocyanates in the Total Formulation | Percent of Multifunctional Aromatic Isocyanates Under 300 Daltons in Isocyanate Component of the Formulation |
|---|---|---|---|---|---|
| None | 0.205" | 0.255" | 0.268" | NA | NA |
| pMDI | 0.142" | 0.201" | 0.241" | 100% | 48% |
| W-15 | 0.039" | 0.062" | 0.074" | 100% | 93% |

FIG. 9 is a photograph of cross-sectional cuts of a side-by-side comparison between Parallam samples exposed to a three day one-sided wetting test. The major face pictured for each sample is not the face directly exposed to water, but bonding resin and emulsified wax, (2) forming a mat from the treated strands, and (3) consolidating the mat under conditions of heat and pressure to form a billet. The billets are cut into smaller sections (beams, headers, or columns)

that are used as framing members. The treatment described in this example includes three main operations that occur sequentially beginning about 1.5 hours after the billets are formed. The operations include a preliminary water treatment, application of a formulation known as "W18.G11" and a final water treatment, each occurring in a different booth. Parallam is transported through the booths on conveyors at 60-150 ft/min.

The W18.G11 is prepared in an on-site, temperature-controlled mix tank plumbed to a first storage tank and a second storage tank. The first storage tank holds Lupranate®280, Which is manufactured by the BASF Corporation of Wyandotte, Mich. The second storage tank holds a mixture of Reactint® Yellow X15, Reactint® Red X64, and Reactint® Blue X17AB, all manufactured by Milliken Chemical of Spartanburg, S.C. The two components are loaded into the mix tank at a ratio of 99 parts by mass Lupranate®280 and 1 part by mass of the total reactive dye mixture. Once loaded, the components are stirred at a temperature of about 15-27° C. within the mix tank and allowed to react for a period of at least 15 minutes. The resulting batch of finished W18.G11 includes about 60% 4,4'-MDI, 31% of a mixture of 2,2'-MDI and 2,4'-MDI, 8% oligomeric pMDI, 0.9% polyol dyes, and 0.1% optical brightener.

The preliminary water treatment includes applying liquid water via low-pressure sprayers to the top, bottom, left, and right surfaces of the Parallam at a target application rate of 2-6 g/ft$^2$ depending on the temperature of the Parallam, which may be about 60° F. to 160° F. A portion of the applied water is absorbed into the Parallam and the rest of the water evaporates. The preliminary water treatment may serve to cool the surfaces of the Parallam and to reduce emission of the subsequently applied W18.G11. After the preliminary water treatment, W18.G11 is applied to the top, bottom, left and right surfaces of the Parallam at a target application rate of 6 g/ft$^2$. The booth in which the W18.G11 is applied is coupled to a ventilated enclosure. Within the booth, the conveyor system contacts the Parallam at only a limited number of points in order to avoid transferring large amounts of W18.G11 onto the conveyor. Once applied, the W18.G11 rapidly absorbs into the Parallam. The final water treatment is similar to the preliminary water treatment. Within the third booth, liquid water is applied via low-pressure sprayers to the top, bottom, left, and right surfaces of the Parallam at a target application rate of 2-6 g/ft$^2$ depending on the temperature of the Parallam, which may be less than 130° F.

After the preliminary water treatment, the application of W18.G11, and the final water treatment, the treated Parallam is stacked, packaged, and moved to a storage location outdoors. MDI emissions from the treated Parallam in the finishing line workplace may be sufficiently low to yield an air-borne MDI concentration of less than 1 ppb. The treated Parallam is allowed to cure for a period of time sufficient to convert tow molecular weight isocyanate molecules to reaction products. The resulting modified Parallam has enhanced resistance to water infiltration and graying relative to untreated Parallam.

CONCLUSION

This disclosure is not intended to be exhaustive or to limit the present technology to the precise forms disclosed herein. Although specific embodiments are disclosed herein for illustrative purposes, various equivalent modifications are possible without deviating from the present technology, as those of ordinary skill in the relevant art will recognize. In some cases, well-known structures and functions have not been shown and/or described in detail to avoid unnecessarily obscuring the description of the embodiments of the present technology. Although steps of methods may be presented herein in a particular order, in alternative embodiments the steps may have another suitable order. Similarly, certain aspects of the present technology disclosed in the context of particular embodiments can be combined or eliminated in other embodiments. Furthermore, while advantages associated with certain embodiments may have been disclosed in the context of those embodiments, other embodiments may also exhibit such advantages, and not all embodiments need necessarily exhibit such advantages or other advantages disclosed herein to fall within the scope of the present technology.

Throughout this disclosure, the singular terms "a," "an," and "the" include plural referents unless the context clearly indicates otherwise. Similarly, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Additionally, the terms "comprising" and the like are used throughout this disclosure to mean including at least the recited feature(s) such that any greater number of the same feature(s) and/or one or more additional types of features are not precluded. Directional terms, such as "upper," "lower," "front," "back," "vertical," and "horizontal," may be used herein to express and clarify the relationship between various elements. It should be understood that such terms do not denote absolute orientation. Reference herein to "one embodiment," "an embodiment," or similar formulations means that a particular feature, structure, operation, or characteristic described in connection with the embodiment can be included in at least one embodiment of the present technology. Thus, the appearances of such phrases or formulations herein are not necessarily all referring to the same embodiment. Furthermore, various particular features, structures, operations, or characteristics may be combined in any suitable manner in one or more embodiments of the present technology.

We claim:

1. A composite wood product, comprising:
a composite substrate including wood and a binder, wherein a CIELab b* value of the substrate decreases by a first amount to a first value in response to a 120-day exposure at 7 inches separation distance to a UV lamp with a UVA (315-400 nm) output of 13.6 W and a UVB (280-315 nm) output of 3.0 W; and
a sealant disposed within a surface portion of the substrate, wherein the sealant includes substituted aniline photoresponsive molecules at an average concentration greater than 1000 parts per million in an outermost one millimeter of the substrate, wherein a CIELab b* value of the sealant increases by a second amount to a second value in response to the 120-day exposure at 7 inches separation distance to the UV lamp, and wherein a CIELab b* value of the wood product in response to the 120-day exposure at 7 inches separation distance to the UV lamp is greater than the first value.

2. The composite wood product of claim 1 wherein the CIELab b* value of the wood product in response to the 120-day exposure at 7 inches separation distance to the UV lamp decreases by an amount less than the first amount.

3. The composite wood product of claim 1 wherein the CIELab b* value of the wood product in response to the 120-day exposure at 7 inches separation distance to the UV lamp increases by an amount less than the second amount.

4. The composite wood product of claim 1 wherein the CIELab b* value of the wood product in response to the 120-day exposure at 7 inches separation distance to the UV lamp is unchanged.

5. The composite wood product of claim 1 wherein:
the first amount is at least 7; and
the second amount is at least 7.

6. The composite wood product of claim 1 wherein the sealant includes colorizing molecules individually having one or more covalently bound chromophores.

7. The composite wood product of claim 1 wherein the sealant is a crosslinked urethane resin present within the surface portion of the substrate at an average concentration from 0.05% to 5.0% by weight.

8. The composite wood product of claim 1 wherein the photoresponsive molecules have the same or different respective molecular weights less than 500 daltons.

9. The composite wood product of claim 1 wherein the photoresponsive molecules form quinone-like molecules in response to all or a portion of the 120-day exposure at 7 inches separation distance to the UV lamp.

* * * * *